United States Patent [19]

Stites

[11] 4,198,137
[45] Apr. 15, 1980

[54] MICROFILM READER/PRINTER WITH NORMALLY OPEN AND REMOVABLE GLASS FLAT ASSEMBLY

[75] Inventor: David G. Stites, Elgin, Ill.

[73] Assignee: Bell & Howell Company, Chicago, Ill.

[21] Appl. No.: 900,395

[22] Filed: Apr. 26, 1978

[51] Int. Cl.² .............................................. G03B 1/48
[52] U.S. Cl. .................................. 353/23; 353/26 R; 353/95
[58] Field of Search ..................... 353/22, 23, 24, 95, 353/26 R, 26 A, 27 R, 27 A

[56] References Cited

U.S. PATENT DOCUMENTS

| | | | |
|---|---|---|---|
| 2,610,540 | 9/1952 | Beitz | 353/23 |
| 3,183,771 | 5/1965 | Rutkus | 353/26 R |
| 3,604,793 | 9/1971 | Wangerin et al. | 353/23 |
| 3,784,295 | 1/1974 | Okano | 353/95 |
| 3,868,180 | 2/1975 | Priest | 353/26 R |

Primary Examiner—Steven L. Stephan
Attorney, Agent, or Firm—Alan B. Samlan; J. Warren Whitesel

[57] ABSTRACT

A pair of glass flats are mounted in a removable carrier frame assembly, which is adapted to be inserted into a microfilm reader/printer. Supports on the carrier frame may be rested upon a front panel of a reader/printer in order to facilitate an alignment and an insertion of the carrier. A solenoid controlled mechanical linkage normally holds the glass flats in an open position except when the film is actually being projected. Then, they close. Signals are sent back to indicate to the reader/printer whether the flats are opened or closed and to control it in response thereto.

9 Claims, 8 Drawing Figures

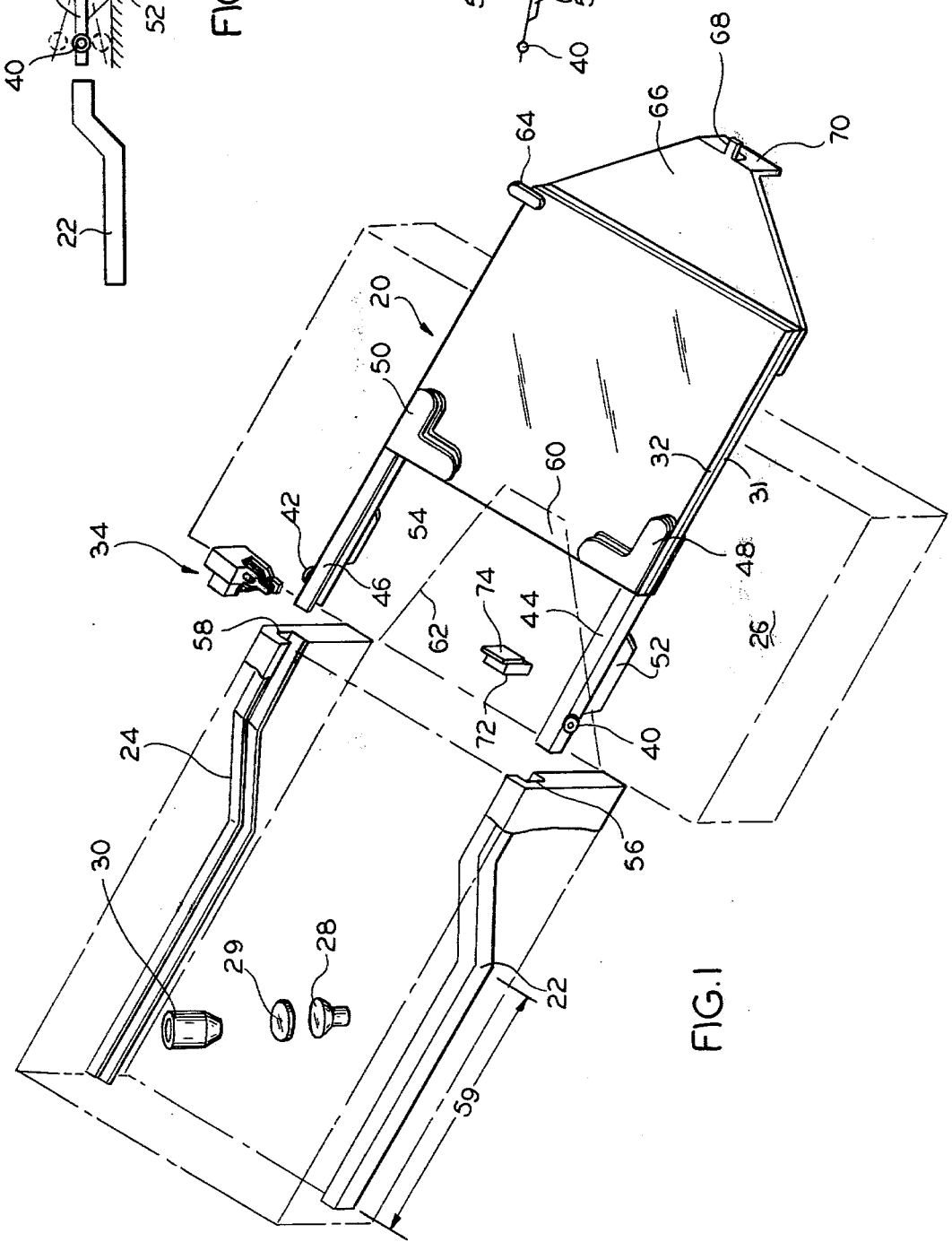

MICROFILM READER/PRINTER WITH NORMALLY OPEN AND REMOVABLE GLASS FLAT ASSEMBLY

This invention relates to microfilm reader/printers and more particularly reader/printers having removable, spaced parallel glass flats which are electrically controlled.

A U.S. patent application, entitled "Microprocessor Controlled Roll Film Microfiche Reader," Ser. No. 711,180, filed Aug. 3, 1976, now U.S. Pat. No. 4,110,020, shows and describes a microfilm reader/printer wherein roll film is automatically transported to display an image at any selected location. There the film stops and an image of the film at that location is either projected onto a screen or used to print a readout copy. The film is clamped between two pieces of plate glass (commonly called "glass flats") when the image is projected in order that the film will lie in a flat focal or optical plane. While the film is being transported, it is desirable to open the glass flats to reduce the possibility that it will be scratched. Accordingly, an electrical control circuit provides signals for commanding an automatic opening and closing of the glass flats. This control circuit should operate the glass flats responsive to signals which are derived either directly from the film, or an equivalent thereof. The above-identified co-pending application shows a system for so deriving such signals from the film used in a microfilm reader/printer.

Another co-pending application entitled "Electronic Control System for Data Retrieval Reader and Printer," Ser. No. 741,929, filed Nov. 15, 1976, shows details of a microprocessor controlled circuit for operating the same reader/printer. Yet another co-pending application entitled "Roll Film Reader/Printer with Manually Insertable Discrete Film," Ser. No. 759,157, filed Jan. 13, 1977, shows a way of deriving glass flat control signals from a carrier used for inserting discrete pieces of film into the reader/printer.

For a fail-safe operation, the glass flats should normally stand in their open condition. This way, the film is least likely to become scratched during either an expected or an unexpected transport. Heretofore, most glass flats normally stood in a closed position and were opened only during transport. This means that, if the glass flat control circuit should fail while film is being transported, it might be damages.

Another consideration for the use of glass flats and their control devices is that they should be easy to clean. They may become so badly smudged or dusty that the projected image is difficult to see clearly. Also, when the reader/printer is controlled by bar codes formed on the film itself, a smudge on a glass flat over the code may cause it to become misinterpreted or unreadable. Since all codes are read at the same location, a single smudge might make the entire machine inoperative. These smudges are especially likely to occur when separate and removable microfilm carriers are inserted directly into the reader/printer and between the glass flats. Furthermore, dirt is likely to accumulate in a dusty environment where static electricity is the normal motive force for dust accumulation.

Accordingly, an object of this invention is to provide new and improved control over glass flats, and in particular to provide such control in conjunction with removable glass flats.

Another object of the invention is to provide microfilm reader/printers having easily removable sets of glass flats. Here, an object is to provide means for easily aligning the glass flats prior to their insertion into a reader/printer.

A further object is to provide glass flats which are normally open, except during reading, when they are operated off-normal to a closed position.

In keeping with an aspect of the invention, these and other objects are accomplished by providing a pair of opposed generally Z-shaped channels in a microfiche reader/printer for receiving a pair of opposed rollers on a microfiche carrier. The carrier has a pair of opposed feet positioned near the rollers to enable the glass carrier to be tipped up and down in order to easily bring the rollers into an alignment with the exposed ends of the Z-shaped channels. The carrier has a pair of glass flats, one of which is pivotally mounted thereon in order to raise and lower for clamping or unclamping a film positioned between them. The pivoted glass flat has an lifting tab cemented or otherwise attached thereto. While the glass flat is in its installed or home position, the lifting tab is normally held in an upward or open position by a solenoid-controlled bracket. When the solenoid is energized, the controlled bracket moves the lifting tab and, therefore, the glass flat, to the closed position.

A preferred embodiment of the invention is shown in the appended drawings, wherein:

FIG. 1 is a perspective view of the inventive glass flats carrier, a schematic view of a pair of opposed Z-shaped channels, and selected portions of a microfilm reader/printer surrounding the glass flats;

FIG. 2 schematically illustrates how the carrier frame is supported on a pair of opposed feet so that it may be tipped up or down for easy insertion;

FIG. 3 shows how the carrier provides for supporting a spaced parallel pair of glass flats, with one flat hinged so that it may be raised or lowered;

Figure 4:
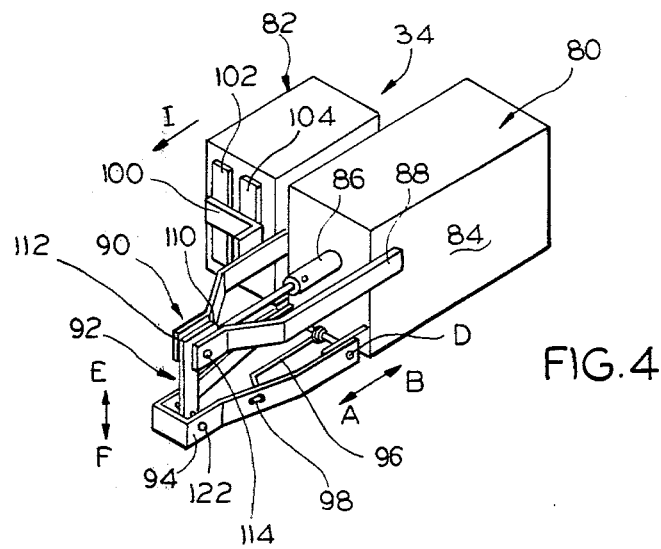
FIG. 4 shows, in perspective, a solenoid, "Microswitch," and a solenoid-controlled bracket for raising and lowering the hinged glass flat.

FIG. 1 includes the inventive glass flats carrier 20, a pair of opposed Z-shaped guideways or channels 22,24 for receiving and supporting the carrier, a housing plate 26 for supporting the carrier 20 prior to its insertion, a light source 28, condenser lens 29, and image-projecting lens 30 for providing an optical path through the glass flats, and a pair of glass flats 31,32 controlled by a solenoid 34. All parts disclosed in FIG. 1 are used in a microfilm reader/printer, which is broadly shown in FIG. 8. The remainder of the reader/printer may be understood from a study of the above-identified co-pending patent applications.

The carrier 20 includes a metal frame having a pair of opposed rollers or glides 40,42 at one end of a pair of spaced parallel side rails 44,46. Upper and lower glass flats are cemented to corner supports 48,50 at the other ends of the side rails 44,46.

Means are provided for adjustably supporting the carrier in order to align it immediately prior to its insertion into the reader/printer. More particularly, a pair of opposed support feet 52,54 are formed on the bottoms of the side rails 44,46. By resting the feet 52,54 on plate 26 and adjustably tipping the carrier up or down, as shown in FIG. 2, the rollers 40,42 may be raised or lowered so that they are positioned opposite the exposed ends of the Z-shaped channels (i.e., opposite recesses 56,58 which form the entrances into the Z-shaped guides 22,24). This way, it is not necessary to hold the rollers 40,42 in a steady but unsupported position while attempting to align the rollers with the opposite entrance recesses 56,58.

The top of panel 26 has a generally V-shaped opening cut into it along edges 60,62 so that the feet 52,54 drop off the plate 26 as the rollers 40,42 move down the inclined planes of the opposed Z-shaped channels 22,24. At the bottom of the Z-shaped channels, there are relatively long horizontal sections 59. When the carrier 20 is pulled out of the reader/printer as far as permitted by the lowermost horizontal sections 59 of the Z-shaped channels 22,24, the upper and hinged glass flat 32 may be opened, as seen in FIG. 3. Also, while the rollers 40,42 are still supported in the lower horizontal sections of the Z-shaped channels 22,24, the light from source 28 travels through condenser lens 29, the glass flats 31,32 and the image projection lens 30 to a screen.

The glass flats 31,32 are mounted in the carrier by being cemented to the upper and lower corner flat supports 48,50. The hinges for enabling a raising or lowering of the upper glass flat 32 are connected between the upper supports 48,50 and the side rails 44,46. At the other end of the glass flats, an lifting tab 64 is cemented to the upper surface of the top glass flat 32 and a guide plate 66 is cemented to the lower surface of the bottom glass flat 31. A handle or tip 68 projects beyond an end of the guide plate 66, so that it may be more easily manipulated and removed by the user. A tab 70 is dependent from plate 66 and positioned to trip a position-sensing switch 72 via actuator arm 74 when the carrier 20 is in the correct reading position, to give a signal that the microfilm reader/printer is in an operating condition. The carrier 20 may be pushed in far enough to enable an image to be projected through the lens 30. An adjusting nut 67 and adjusting screw 69 are provided to provide a third point of support which is adjustable for making the carrier 20 perpendicular to the light source 28 and associated optical path.

Preferably, the mount for lens 30 floatingly rides on the upper surface of the top glass flat 32 to insure proper focus and alignment.

According to the invention, the glass flats are normally held open and are closed only to project an image. Heretofore, the glass flats have been normally closed and thereafter held in an open position during film transport. In the present invention, there is provided a fail-safe feature, not heretofore available, wherein the film is not scratched even if the glass flat solenoid fails.

Figure 5:
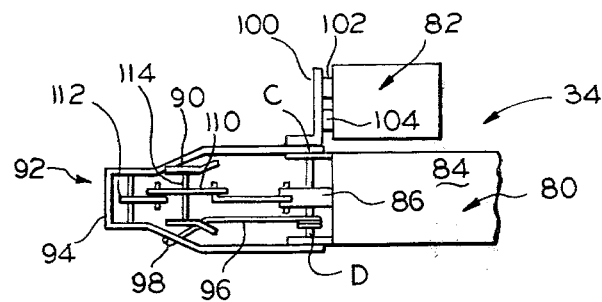
FIG. 5 is a partial plan view of selected parts of the solenoid of FIG. 4.

The means for so controlling the operation of the glass flat is broadly shown at 34 in FIG. 1 and is shown in detail in FIGS. 4,5. More particularly, the major sub-assemblies in the glass flat control device are a solenoid assembly 80 and a position-sensing switch assembly 82. The film cannot be transported if either of the switches 72 or 82 indicates that the glass flats are not seated properly or if they then are in the closed position.

Figure 6:
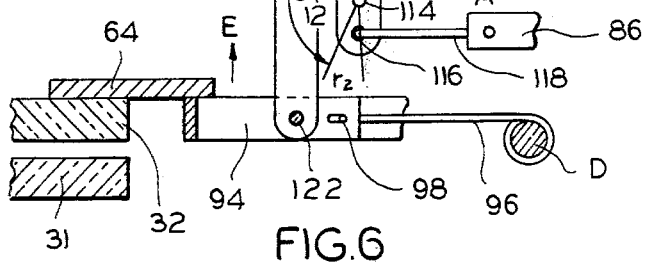
FIGS. 6 and 7 are two stop-motion views which show a bell crank linkage which is used for selectively raising or lowering the hinged glass flat.
Figure 7:
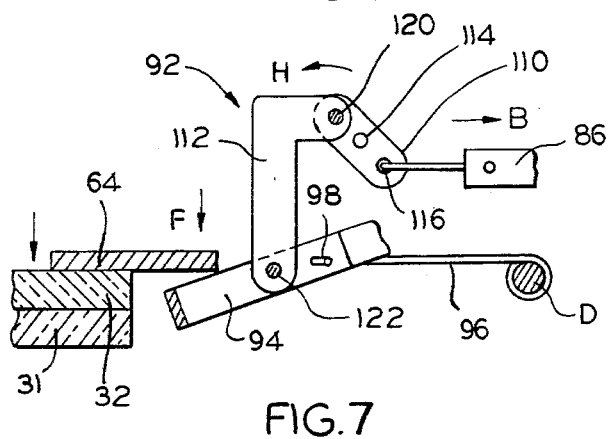

The solenoid assembly 80 comprises a winding 84 and a sliding lifting tab 86. Normally, a spring 96 urges the lifting tab to slide to a stop in direction A. When the winding is energized, the resulting magnetic field pulls lifting tab 86 in direction B and against the urging of the spring. Rigidly secured to the housing of the solenoid 80 is a bracket 88 which projects outwardly and to a position in front of the sliding lifting tab 86. At its outer end 90, the bracket 88 pivotally supports a rotary glass flat control linkage or bell crank arm 92 which is also shown in FIGS. 6,7. Pivotally attached to the solenoid housing, at C,D, is a glass flat control bracket 94 which is pivotally attached to the linkage 92. A spring 96 begins with a coiled form which extends from an axle between points C,D to an operating point 98 for the bracket 94. The spring 96 normally urges the glass flats control bracket 94 to swing upwardly, in direction E.

Means are provided for transmitting electrical signals to indicate the opened or closed position of the glass flats. More particularly, when the solenoid 80 is operated, the lifting tab 86 retracts against the force of spring 96 and the linkage 92 pushes the glass flats control bracket 94 downwardly in direction F, and thereby close the glass flats. Integrally attached to and moving with the bracket 94 is a horizontal lever arm 100 which controls the positions of two vertically-oriented leaf springs 102,104 for opening and closing contacts in position-sensing switch 82 and thereby signalling an associated electrical control circuit as to whether the glass flats are opened or closed. The control circuit may issue any suitable command signals responsive to these switch operations. For example, the film transport in the reader may be inhibited or disabled when the flats are closed and the optical system is enabled (and vice versa when the flats are open).

The glass flat control bell crank linkage 92 is shown in detail in FIGS. 6 and 7. In greater detail, this linkage 92 includes a bell crank or pair of pivotally interconnected, elongated lever arms or links 110,112. The first of these arms or links (110) is an elongated member which is pivotally supported (at 114), near its midpoint, on the outer end 90 of bracket 88. The lower end 116 of arm of link 110 is connected through a horizontal link 118 to the solenoid controlled lifting tab 86. The other and upper end 120 of link 110 is connected through another elongated and generally L-shaped link 112 to a pivot point 122 on the glass flat supporting bracket 94. Armature 64 of glass flat 32 rests upon and is raised and lowered by the bracket 94. Pivotal radii, $r_1$ and $r_2$ and angular relationships $\theta_{12}$ are selected at the pivot points so that the solenoid force function is transformed more efficiently into the glass flat operating mechanism and spring force function, i.e., proper matching to use the smallest possible solenoid.

Figure 8:
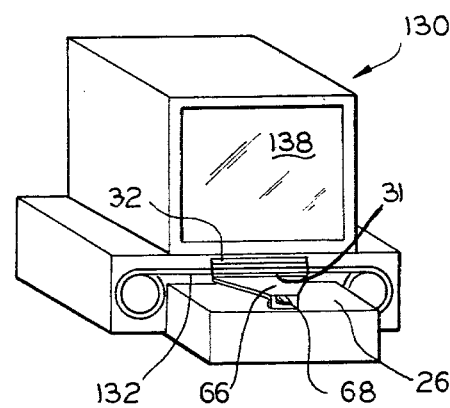
FIG. 8 is a perspective view of a microfilm reader/printer, which incorporates the invention.

FIG. 8 illustrates a microfilm reader/printer 130 which incorporates the principles of the invention. Briefly, film 132 may be transported back and forth between reels 134,136 and between the open glass flats 31,32. When the transport of the film 132 stops, the glass flats 31,32 automatically close in order to clamp the film in a flat focal or optical plane. Light is transmitted through the film 132 while it is so clamped, in order to display an image on a screen 138. After the image has been projected, flats 32,31 open and the film may again be transported. If the glass flats are removed, the switch 72 (FIG. 1) is opened and the reader/printer is disabled.

The operation of the glass flat control mechanism should now be clear. More specifically, in the normal upright position of links 110,112 (FIG. 6), coiled spring 96 urges bracket 94 in direction E, which also is to an upward position. Armature 64, and therefore the top glass flat 32, is raised. Th pivotally interconnected pair of links 112,110 are urged in direction G, thereby pulling link 118 and lifting tab 86 in direction A.

When the solenoid winding 84 is energized, lifting tab 86 and its link 118 are pulled in direction B to rotate the first upright link 110 in direction H (FIG. 7). This rotation of link 110 causes the distant end of the L-shaped link 112 to move downwardly in direction F. The glass flat support bracket 94 also moves downwardly in direction F to lower the lifting tab 64 and thereby close the glass flat 32. As the bracket 94 moves in direction F, its integrally attached lever arm 100 (FIG. 4) moves in direction I to enable the leaf springs 102,104 to move under their own spring tension away from the switch 82 and thereby control its contacts.

After the projected image is no longer required, any suitable reader/printer control signal may de-energize the solenoid 84. The lifting tab 86 is released and the spring 96 pulls bracket 94 back in direction E to the open flat position of FIG. 6. The interconnected pair of links 110,112 returns lifting tab 86 to its extended or released position. The lever arm 100 returns to normal to push leaf springs 102,104 toward the switch 82.

Those who are skilled in the art will readily perceive how various modifications may be made in the described structure. Therefore, the appended claims are to be construed broadly enough to cover all equivalents falling within the scope and spirit of the invention.

I claim:

1. A microflim reader/printer comprising an optical path including a vertical lens means for projecting an image on said film, slidably removable carrier means including a pair of spaced glass flats lying in a horizontal plane for clamping said film in an optical plane when said image is to be projected from said film, a lifting tab means attached to one of said glass flats and operated by a solenoid controlled mechanical linkage system, means for normally holding said pair of glass flats in an open position so that said film may be transported between said glass flats with minimum danger of scratching, and means for closing said pair of glass flats to clamp said film in said optical plane while said image is being projected through said optical path wherein said means for normally holding said pair of glass flats in an open position and for closing said pair of glass flats comprises an interconnected pair of links, a first link having a length and width, the length greater than the width, and the first link having opposite ends in the length direction, the first link being normally held such that the length is in a generally upright position and pivoted near approximately its midpoint between the opposite ends, the second of said links being pivotally interconnected to said first link near one of said first links ends when in the upright position, and solenoid means connected near the end of said first link opposite the end the second link is connected to for pivoting said first link off said normally upright position thereby lowering the second link, and bracket means connected to said second link for supporting and moving said lifting tab whereby the glass flats are controlled.

2. The reader/printer of claim 1 and means for adjustably supporting said carrier means in order to facilitate an alignment of said carrier prior to its insertion into said reader/printer.

3. The reader/printer of claim 2 wherein said reader/printer includes a pair of opposed generally Z-shaped channels for receiving said carrier means whereby said carrier may be inserted and then lowered into position under said lens means.

4. The reader/printer of claim 3 wherein said Z-shaped channels have a relatively long horizontal slot for securing said carrier means when in said lowered position so that said image-projecting means may be moved over an entire area covered by said film.

5. The reader/printer of claim 3 wherein said carrier means has a pair of opposed rollers on the edge which first enters said channels when said carrier is being inserted into said reader/printer.

6. The reader/printer of claim 1 and means responsive to the operation of said means for holding and moving said lifting tab for transmitting electrical signals to indicate the opened or closed position of the glass flats.

7. A microfilm reader/printer comprising a pair of horizontally disposed glass flats, means for selectively raising or lowering one of said glass flats for opening or closing said pair of glass flats, said raising or lowering means including an interconnected pair of automatically controlled elongated links, a first link having a length and width, the length greater than the width, and having opposite ends in the length direction, the first link being normally pivoted near approximately its midpoint relative the opposite ends and being normally held in a generally vertical position, the second of said links being pivotally interconnected to said first link near the first link's upper end, and means connected near the lower end of said first link for pivoting said first link off said normally vertical position, thereby lowering the second link, pivoted bracket means connected to be raised or lowered responsive to the movement of said second link for supporting one of said glass flats, and means for normally urging said bracket to a raised position.

8. The reader/printer of claim 7, and means responsive to an operation of said lifting tab supporting bracket means for transmitting electrical signals for indicating the position of said bracket.

9. The reader/printer of claim 8 and means responsive to said electrical signal for precluding a transport of film if the glass flats are closed.

* * * * *